(12) United States Patent
Lee et al.

(10) Patent No.: US 11,057,448 B2
(45) Date of Patent: Jul. 6, 2021

(54) METHOD FOR RECEIVING ADAPTIVE STREAMING SERVICE

(71) Applicant: Korea University Research and Business Foundation, Seoul (KR)

(72) Inventors: Jung Hwan Lee, Seoul (KR); Jea-Min Lim, Gyeonggi-do (KR); Jae Hyun Hwang, Gyeonggi-do (KR); Nakjung Choi, Gyeonggi-do (KR); Hyuck Yoo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 430 days.

(21) Appl. No.: 15/566,095

(22) PCT Filed: Apr. 15, 2016

(86) PCT No.: PCT/KR2016/003924
§ 371 (c)(1),
(2) Date: Feb. 22, 2018

(87) PCT Pub. No.: WO2016/167590
PCT Pub. Date: Oct. 20, 2016

(65) Prior Publication Data
US 2018/0183848 A1 Jun. 28, 2018

(30) Foreign Application Priority Data
Apr. 15, 2015 (KR) .................. 10-2015-0053358

(51) Int. Cl.
*H04L 29/06* (2006.01)
*H04N 21/845* (2011.01)
(Continued)

(52) U.S. Cl.
CPC .......... *H04L 65/601* (2013.01); *H04L 65/607* (2013.01); *H04L 65/80* (2013.01);
(Continued)

(58) Field of Classification Search
CPC ..... H04L 65/601; H04L 65/607; H04L 65/80; H04L 67/02; H04N 21/8456;
(Continued)

(56) References Cited

U.S. PATENT DOCUMENTS

| | | | |
|---|---|---|---|
| 2011/0239078 A1* | 9/2011 | Luby | H04N 21/234327 714/752 |
| 2013/0282918 A1* | 10/2013 | De Vleeschauwer | H04N 21/8455 709/231 |

(Continued)

FOREIGN PATENT DOCUMENTS

| | | |
|---|---|---|
| KR | 10-2004-0104063 A | 12/2004 |
| KR | 10-2012-0070999 A | 7/2012 |

(Continued)

*Primary Examiner* — Brian Whipple
*Assistant Examiner* — James Ross Hollister
(74) *Attorney, Agent, or Firm* — Fox Rothschild LLP (57) ABSTRACT

A method for receiving a streaming service is disclosed. The method for receiving a streaming service may be a method performed at a terminal for receiving a streaming service for a video content coded in a layered manner and may include the steps of: (a) sequentially requesting a transmission of at least one video data for a basic layer to be stored in the idle space of a buffer; and (b) sequentially requesting a transmission of video data for a layer of an increased level if the buffer does not have idle space, performed during the decoding of video data corresponding to a single video chunk, where step (b) may be repeated with the level of the layer increased during the decoding of video corresponding to a single video chunk.

8 Claims, 5 Drawing Sheets

(51) Int. Cl.
*H04N 21/2343* (2011.01)
*H04N 21/4402* (2011.01)
*H04N 21/24* (2011.01)
*H04L 29/08* (2006.01)

(52) U.S. Cl.
CPC ..... *H04L 67/02* (2013.01); *H04N 21/234327* (2013.01); *H04N 21/2401* (2013.01); *H04N 21/440227* (2013.01); *H04N 21/8456* (2013.01)

(58) Field of Classification Search
CPC ... H04N 21/234327; H04N 21/440227; H04N 21/2401
See application file for complete search history.

(56) References Cited

U.S. PATENT DOCUMENTS

| | | | | |
|---|---|---|---|---|
| 2016/0277475 | A1* | 9/2016 | Lee | H04L 65/80 |
| 2016/0337671 | A1* | 11/2016 | Ricard | H04N 21/2662 |
| 2018/0007395 | A1* | 1/2018 | Ugur | H04N 21/4384 |

FOREIGN PATENT DOCUMENTS

| | | |
|---|---|---|
| KR | 10-2013-0112936 A | 10/2013 |
| KR | 10-2014-0093430 A | 7/2014 |
| KR | 10-2014-0122202 A | 10/2014 |

* cited by examiner

METHOD FOR RECEIVING ADAPTIVE STREAMING SERVICE

TECHNICAL FIELD

The present invention relates to a method for receiving a streaming service for video contents, more particularly to a method of providing or receiving a streaming service for video contents adaptively without estimates of the available bandwidth in a network environment.

BACKGROUND ART

Existing bit rate selection algorithms for video content streaming services were designed for use in an Internet environment having wired connections. In recent times, however, there is a growing number of clients that use streaming services in a wireless Internet environment such as Wi-Fi or LTE (Long Term Evolution). Due to the inherent properties of a wireless network environment, there may be occurrences of the available bandwidth changing frequently within a short period of time. In a streaming service, which has to satisfy a decoding deadline for video data, such occurrences can be detrimental to the service quality at the client.

For instance, the clients connected to the same AP (Access Point) are assigned the same download rate in the long run, but in an adaptive video streaming service, the step of evaluating (or estimating) bandwidths can yield different network bandwidth estimates for different clients, resulting in requests for video data of different levels of quality.

The reason for this phenomenon is that existing bit rate selection algorithms use information on previously received video data when estimating bandwidths, and such bandwidth estimates are not suitable for wireless network environments where the bandwidths change drastically in the short term.

Figure 1:
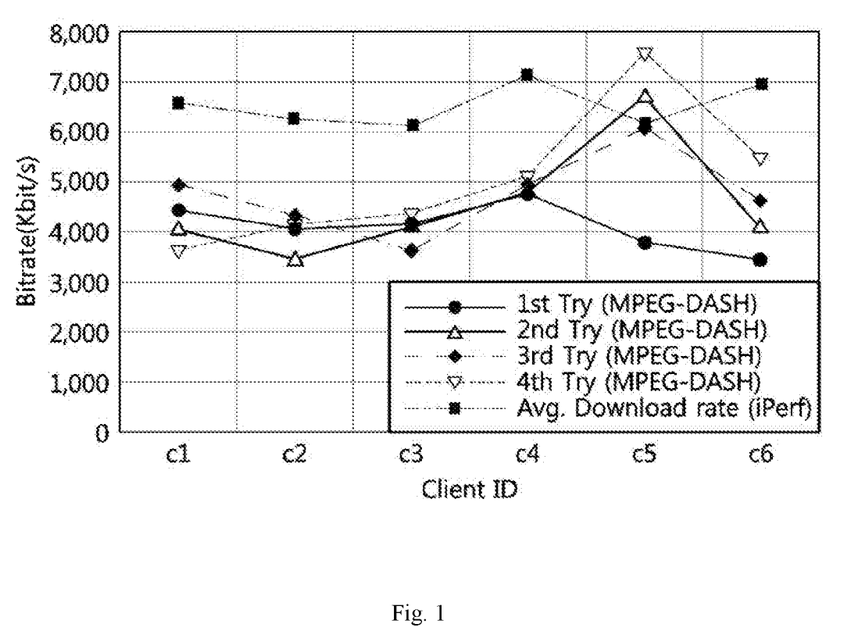
FIG. 1 is a graph illustrating differences in video quality between clients.

FIG. 1 is a graph illustrating differences in video quality between clients. Referring to FIG. 1, the average bandwidth (Avg. Download Rate) and the average video quality selected by an existing bit rate selection algorithm under the same circumstances are shown. FIG. 1 shows that the existing bit rate selection algorithm is unsuitable for a wireless network environment in terms of two aspects. First, even though there is sufficient available bandwidth, the existing bit rate selection algorithm cannot fully utilize the given bandwidth. Second, a difference in quality occurs between the clients, to the extent that a client may have up to twice as high quality as another. Therefore, the present invention proposes a bit rate selection algorithm for an adaptive video streaming service that can be used for an unstable network such as in a wireless network environment.

DISCLOSURE

Technical Problem

The present invention aims to provide a method for adaptively receiving a streaming service without performing estimates regarding network bandwidth in a network environment having frequent bandwidth changes and high inter-channel competition, particularly a wireless network environment.

Technical Solution

A method for receiving a streaming service according to an embodiment of the present invention may be a method performed at a terminal for receiving a streaming service for a video content coded in a layered manner and may include the steps of: (a) sequentially requesting a transmission of at least one video data for a basic layer to be stored in the idle space of a buffer; and (b) sequentially requesting a transmission of video data for a layer of an increased level if the buffer does not have idle space, performed during the decoding of video data corresponding to a single video chunk, where step (b) may be repeated with the level of the layer increased during the decoding of video corresponding to the single video chunk.

The transmission requests sequentially requested in step (a) and step (b) can be transmitted after the reception of video data corresponding to a previous transmission request is completed.

Also, the sequential order of a video chunk corresponding to the video data of which transmission is requested in step (b) may be greater by at least 2 than the sequential order of the single video chunk.

Also, the layer of the increased level may be an enhancement layer of a video chunk subsequent to the last one of the previously received video chunks.

Advantageous Effects

A method for receiving a streaming service according to an embodiment of the present invention can provide fairness in video quality between clients in a network environment having frequent bandwidth changes and high inter-channel competition, particularly a wireless network environment.

Also, the method for receiving a streaming service can increase bandwidth utility compared to existing bit rate selection algorithms and can resolve the problem of halted playing due to an insufficient buffer and the problem of periodic or drastic changes in picture quality.

Also, the method for receiving a streaming service can provide an adaptive video streaming service without performing estimates regarding the bandwidth of the network.

DESCRIPTION OF DRAWINGS

To allow a sufficient understanding of the drawings referred to in the detailed description of the present invention, a detailed description of each figure is provided.

MODE FOR INVENTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

As the embodiments derived from the concept of the present invention allow for various modifications and can be implemented in various forms, certain embodiments are illustrated in the drawings and described in detail in the present specification. However, this is not intended to limit the embodiments derived from the concept of the invention to the specific disclosed forms, and it is to be appreciated that all modifications, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component.

When a component is mentioned to be "connected" or "joined" to another component, this may mean that it is directly connected or joined to the other element, but it is to be understood that yet another component may exist in-between. On the other hand, when a component is mentioned to be "directly connected" or "directly joined" to another component, it is to be understood that there are no other components in-between. The same applies to other expressions describing the relationships of components, such as "between" and "immediately between" or "neighboring" and "directly neighboring".

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

First, the technology serving as the context of the present invention is described below.

DASH (Dynamic Adaptive Streaming over HTTP) is a multimedia data transmission standard for providing an adaptive streaming service over the HTTP. DASH can provide customized services according to environments having various resources such as the display, memory, or computing capability of the clients, and employs a client-driven approach in selecting the quality of the picture that is to be received. To receive the picture in the quality selected by the client, the client may request a picture in units of chunks, which are a picture segmented into small time units. The present specification addresses the algorithm for selecting the quality that is to be requested (Rate Determination Algorithm) from among the functions of a client.

An RDA refers to an algorithm that selects the quality of a picture for providing an adaptive streaming service. The purpose of the RDA is to utilize the client's flexible bandwidth to both increase video quality and solve the problems of the playing being halted by an insufficient buffer (buffer underrun) and the quality changing drastically and periodically during playing (oscillation).

The SVC (Scalable Video Coding or Scalable Video Codec) technique is a standardized codec for providing video contents in consideration of clients of various environments in which network conditions or device conditions may differ. In order to support various resolutions, frame rates, and quality levels for a picture, there may be layered coding for supporting spatial, temporal, and quality scalability, with extractions performed for each layer. Here, the extracted layers can be classified into the base layer, for critical elements required in a service, and enhancement layers, for scalability. Thus, a streaming service using the SVC technique can resolve the problems of having to supply additional altering operations (transcoding) or providing multiple pictures separately when providing a service that considers the environments of various clients. Examples of relevant standardized codecs include H.264/SVC or H.264/SHVC.

A detailed description is provided below, with reference to the accompanying drawings, on certain embodiments of the present invention.

Figure 2:
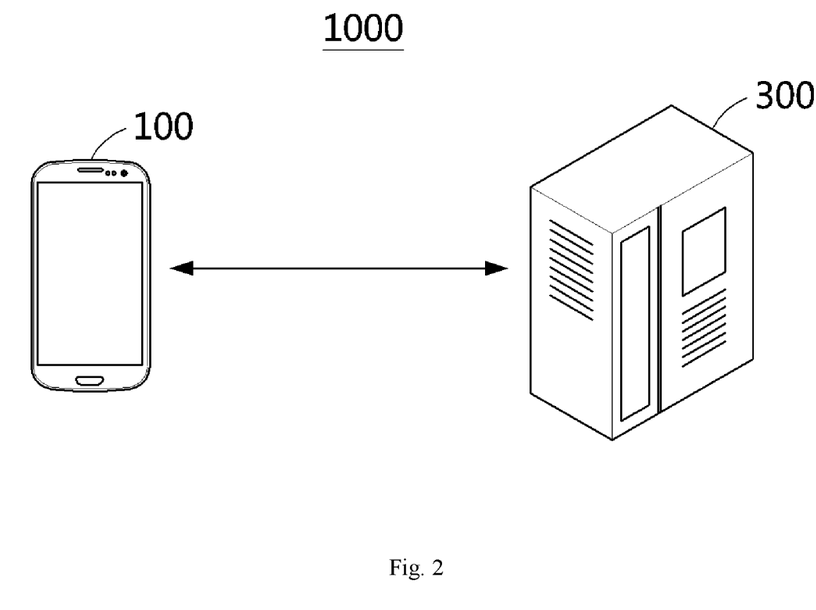
FIG. 2 illustrates a video streaming system according to an embodiment of the present invention.

FIG. 2 illustrates a video streaming system according to an embodiment of the present invention.

Referring to FIG. 2, a video streaming system 1000 may include a terminal 100 and a content server 300.

The terminal 100, which may also be referred to as user equipment or a client, etc., can transmit a transmission request for a video content to the content server 300 and receive video data corresponding to the transmission request and play the video data by streaming.

The terminal 100 can be implemented as a data processing device such as a PC (personal computer), a tablet PC, a notebook, a net-book, an e-reader, a PDA (personal digital assistant), a PMP (portable multimedia player), an MP3 player, or an MP4 player or as a handheld device such as a mobile phone or a smart phone.

The content server 300 can store multiple video contents and can provide the video content requested from the terminal 100 in units of chunks to the terminal 100. Here, the content server 300 can provide the video content to the terminal 100 via a cache server, a router, or a proxy server, and in certain embodiments, the content server 300 can itself be understood as a term representing a cache server, router, or proxy server.

The content server 300 may divide each video content into preconfigured units (e.g. chunks) and store the multiple content sections, where each of the content sections may be encoded by SVC to have multiple layers as it is stored. A single chunk may have a constant play time (e.g. 2 seconds).

While the video streaming service provided by the present invention is not limited in application to one of a wired or a wireless network, it can be expected that the advantages obtained would be greater when the application is for a network environment in which the available bandwidth changes frequently (or drastically), particularly a wireless network environment.

Figure 3:
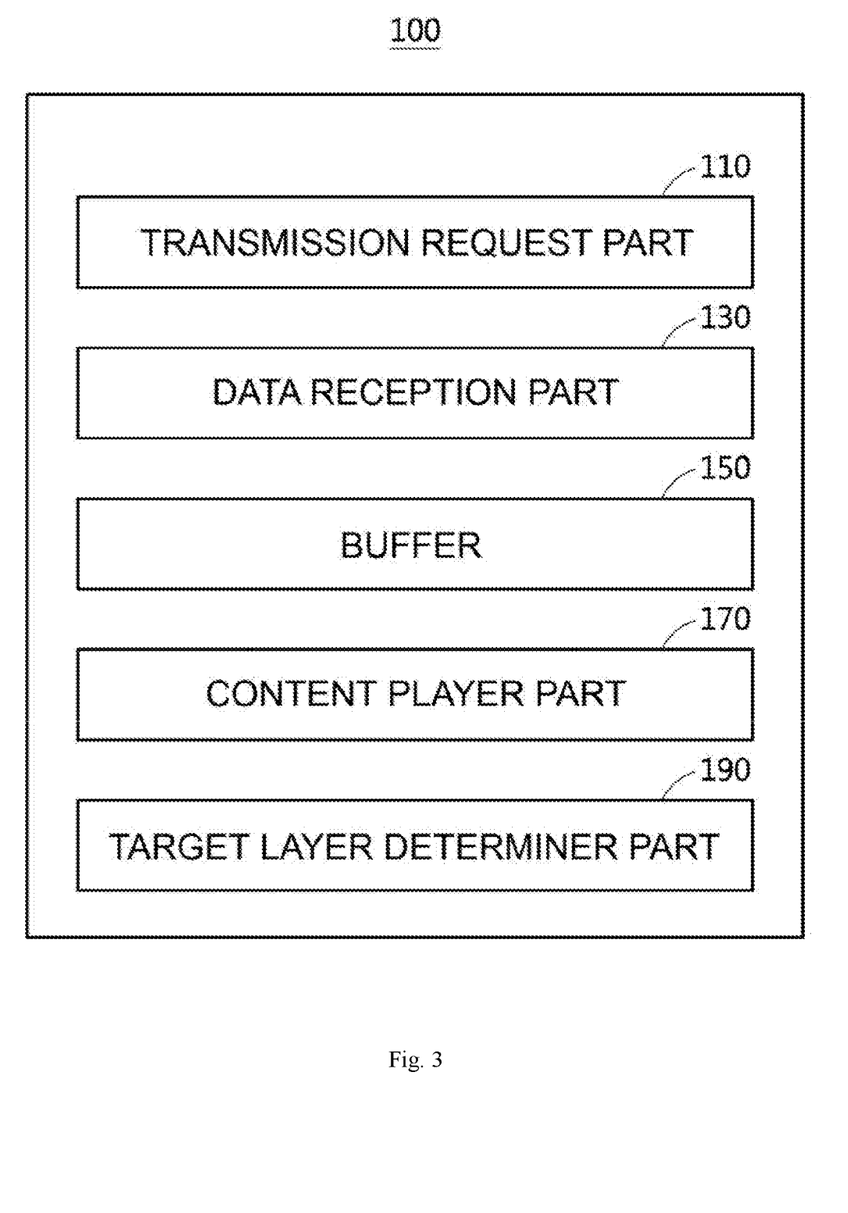
FIG. 3 is a functional block diagram of the terminal illustrated in FIG. 2.

FIG. 3 is a functional block diagram of the terminal illustrated in FIG. 2. Referring to FIG. 2 and FIG. 3, the terminal 100 may include a transmission request part 110, a data reception part 130, a buffer 150, a content player part 170, and a target layer determiner part 190.

The transmission request part 110 may transmit to the content server 300 a transmission request for video data associated with a target layer that is to be received. The transmission request can include video chunk information (e.g. the sequential order of the video chunk) by which to identify the video chunk that is to be received and layer information (e.g. the level of the layer) by which to identify the layer of the video chunk identified by the video chunk information. In certain embodiments, the transmission request can further include content identification information by which to identify the video content being requested.

The data reception part 130 may receive from the content server 300 the video data corresponding to the transmission request transmitted by the transmission request part 100, and the buffer 150 may perform sequential buffering for the video data received by the reception part 130 according to the sequential order of the video chunks. The buffer 150 can store streaming data corresponding to the size (or length) of the buffer 150. The size of the buffer 150 does not refer to the physical size of the buffer 150 but rather can refer to the possible playing time.

The content player part 170 can decode and play the video data buffered by the buffer 150.

The target layer determiner part 190 can determine the layer that is to be received, i.e. the target layer, and the transmission request part 110 may transmit to the content server 300 a transmission request for video data of a target layer determined by the target layer determiner part 190. The detailed operations of the target layer determiner part 190 will be described with reference to FIG. 4.

A person of ordinary skill in the field of art to which the present invention pertains would easily appreciate that the components of the terminal 100 illustrated in FIG. 3 can be separated in terms of function and logic but may not necessarily be implemented in physically separate devices or by separate code.

Figure 4:
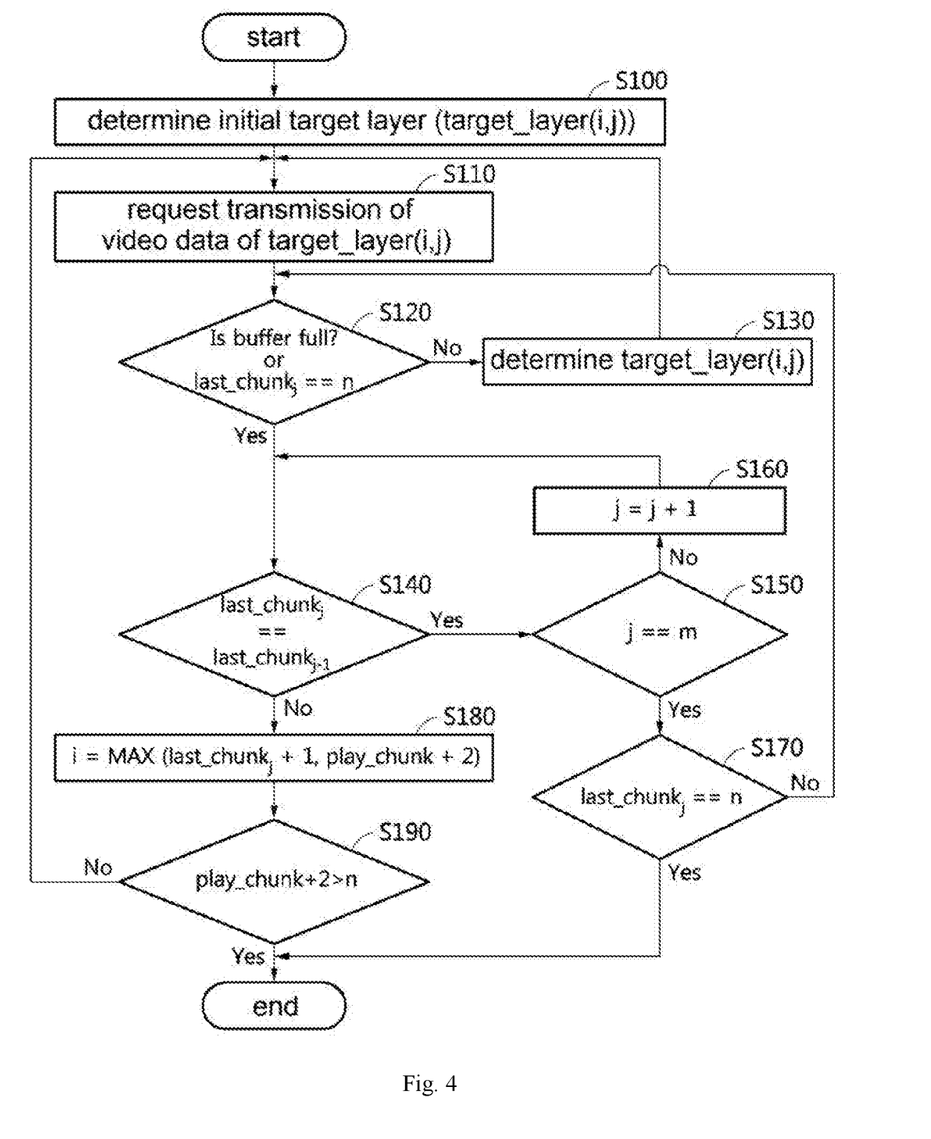
FIG. 4 is a flow diagram describing a method performed at the terminal illustrated in FIG. 2 for receiving a streaming service.

FIG. 4 is a flow diagram describing a method performed at the terminal illustrated in FIG. 2 for receiving a streaming service, and more specifically, is a flow diagram for describing the process of determining a target layer performed by the target layer determiner part and the process of requesting transmission performed by the transmission request part.

Before providing the more detailed description, it will be supposed that the video content being provided by the streaming service is divided into a total of n video chunks (where n is a natural number) and is encoded to have an m number of layers (where m is a natural number of 2 or higher).

Referring to FIG. 2 to FIG. 4, the target layer determiner part 190 of the terminal 100, in order to be provided with a streaming service for a video content, may first determine or configure an initial target layer (target_layer(i,j)) (S100). In a target layer (target_layer(i,j)), i (where i is a natural number greater than or equal to 1 and smaller than or equal to n) represents the sequential order of the video chunk, and j (where j is a natural number greater than or equal to 1 and smaller than or equal to m) represents the level of the layer. In step S100, i and j can be determined as 1. That is, the initial target layer may be the first layer (basic layer) of the first video chunk.

In step S110, the transmission request part 110 of the terminal 100 may transmit a transmission request of video data for the target layer (target_layer(i,j)) to the content server 300. Here, since i and j are equal to 1, the terminal 100 may transmit a transmission request for video data corresponding to the first layer of the first video chunk to the content server 300.

In step S120, the target layer determiner part 190 may ascertain whether or not the buffer 150 is full with layers that are requested for transmission or layers that have been received (or whether or not the buffer 150 has idle space) or whether or not a video chunk requested for transmission or a received video chunk (last_chunkj) is the final video chunk of the video content, i.e. the n-th video chunk.

If it is ascertained in step S120 that the buffer 150 has not yet been filled by layers requested for transmission and that the requested video chunk (last_chunkj) is not the final video chunk of the video content (i.e. last_chunkj≠n), then step S130 may be performed. In step S130, the target layer determiner part 190 of the terminal 100 may determine the next target layer (target_layer(i,j)). That is, the target layer determiner part 190 may determine the sequential order (i) of the video chunk and the level (j) of the layer of the video data that is to be requested. More specifically, the target layer determiner part 190 may increment the sequential order of the video chunk of the target layer by "1". Also, the target layer determiner part 190 can set the value of j to 1.

When step S130 is completed, step S110 may be performed again. That is, the transmission request part 110 may transmit a transmission request of video data for the target layer (target_layer(i,j)) to the content server 300.

If it is ascertained in step S120 that the buffer 150 is filled with layers of which transmission is requested or that the requested video chunk (last_chunkj) is the final video chunk of the video content (i.e. i=n), then step S140 may be performed.

In step S140, the target layer determiner part 190 may ascertain whether or not the sequential order of the last video chunk of the j-th layer (last_chunkj) and the sequential order of the last video chunk of the (j−1)-th layer (last_chunkj−1) are the same, for cases where j does not equal 1.

In step S140, if the sequential order of the last video chunk of the j-th layer (last_chunkj) and the sequential order of the last video chunk of the (j−1)-th layer (last_chunkj−1) are the same, the target layer determiner part 190 may compare the value of j with the value of m (S150), and if the value of j is not equal to the value of m, may increase the value of j by 1 (S160) and perform step S140 again.

If, in step S150, the value of j is equal to the value of m (i.e. the level of the video layer is the maximum level), the target layer determiner part 190 may compare the sequential order of the last video chunk of the j-th layer (last_chunkj) with the number of video chunks (n) included in the video content (S170). If the sequential order of the last video chunk of the j-th layer (last_chunkj) is the same as the number of video chunks (n) included in the video content (i.e. if the last video chunk of the j-th layer is the final video chunk of the video content), the target layer determiner part 190 may finish operation, and if the sequential order of the last video chunk of the j-th layer (last_chunkj) is not the same as the number of video chunks (n) included in the video content (i.e. if the last video chunk of the j-th layer is not the final video chunk of the video content), then step S120 may be performed again.

If it is ascertained that the sequential order of the last video chunk of the j-th layer (last_chunkj) and the sequential order of the last video chunk of the (j−1)-th layer (last_chunkj−1) are not the same in step S140, or if the value of j is 1 but the buffer 150 is full or the sequential order of the last video chunk of the j-th layer (last_chunkj) is ascertained to be n in step S120, then the target layer determiner part 190 may determine the sequential order (i) of the video chunk to be requested (S180). The value of i can be determined using Equation 1 shown below.

$$i = \text{MAX}(\text{last\_chunk}^j + 1, \text{play\_chunk} + 2) \quad \text{[Equation 1]}$$

That is, the i value can be determined as the larger value between the value of the sequential order of the last video chunk of the j-th layer (last_chunkj) increased by 1 and the value of the sequential order of the chunk being decoded or played (play_chunk) increased by 2. Thus, by setting the value of i to be greater than or equal to the sequential order of the chunk being decoded or played added by 2, it is possible to prevent requests for a transmission of video data for a video chunk that is awaiting a shift to the decoding area.

In step S190, the target layer determiner part 190 may compare the value of play_chunk with the value of n, and finish operation if the value of (play_chunk+2) is greater than n and proceed again to step S110 if the value of (play_chunk+2) is not greater than n.

The steps illustrated in FIG. 4 other than step S110 can be understood as being performed by the target layer determiner part 190, while step S110 can be understood as being performed by the transmission request part 110.

Figure 5:
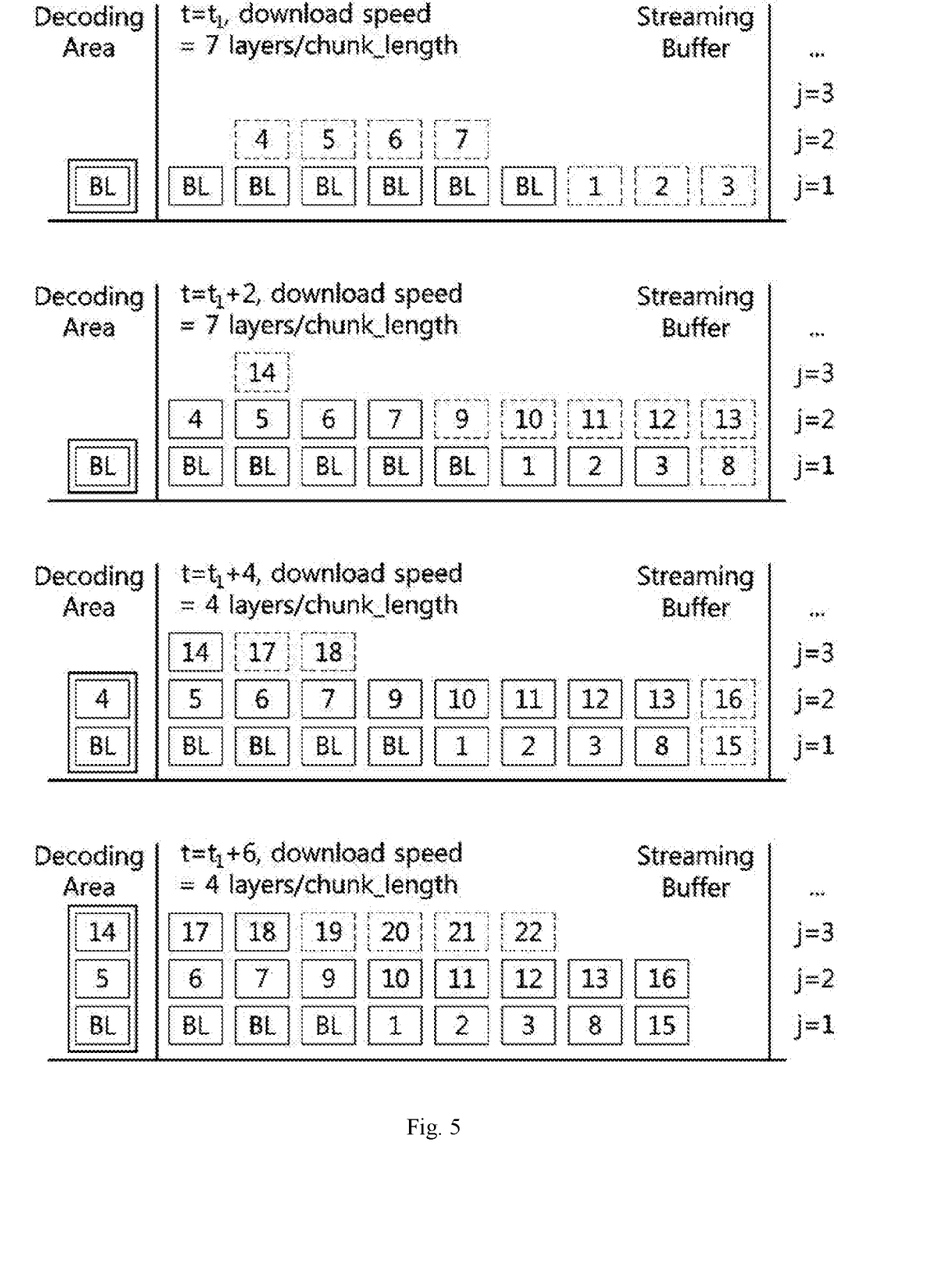
FIG. 5 illustrates a specific embodiment using the method for receiving a streaming service described with reference to FIG. 4.

FIG. 5 illustrates a specific embodiment using the method for receiving a streaming service described with reference to FIG. 4. The descriptions that follow are provided with reference to FIG. 2 through FIG. 5.

It is supposed that the size of a single video chunk is 2 seconds and that the size of the buffer 150 is 18 seconds. Also, in FIG. 5, j can represent the level of a layer.

First, when $t=t_1$, if video data for seven layers can be downloaded during the decoding and playing of a single video chunk (download speed=7 layers/chunk_length), the terminal 100 may sequentially request pictures of the first layer tantamount to the idle space of the buffer 150. As the video data for the first layer 1 to 3 are received, the buffer 150 may be completely filled by the first layer so that there is no more idle space. Afterwards, the terminal 100 may request video data of the second layer of a video chunk corresponding to a front portion of the buffer 150 from the content server 300. That is, the transmission request and reception of video data for the second layer 4 to 7 can be additionally performed. Here, the process for determining the sequential order of the video chunk has already been described with Equation 1 and thus is omitted here.

When $t=t_1+2$, the video chunk at the very front portion of the buffer 150 has been played so that there is idle space at the very back portion of the buffer 150, and as such, the terminal 100 may request the transmission of video data for the first layer 8. With the reception of video data for the first layer 8, the buffer 150 becomes filled with the first layer, and the terminal 100 may sequentially request transmissions according to the manner in which the second layer is arranged. That is, the transmission of video data for the second layer 9 to 13 may be requested, and as the video data for the second layer 9 to 13 is received, the buffer 150 may be completely filled with the second layer. Thus, the terminal 100 may increase the level of the layer by 1 and request transmission of video data for the third layer 14.

When $t=t_1+4$, the video chunk at the very front portion of the buffer 150 has been played so that there is idle space at the very back portion of the buffer 150, and as such, the terminal 100 may request the transmission of video data for the first layer 15. With the reception of video data for the first layer 15, the buffer 150 becomes filled with the first layer, and the terminal 100 may sequentially request transmissions according to the manner in which the second layer is arranged. That is, the transmission of video data for the second layer 16 may be requested, and as the video data for the second layer 16 is received, the buffer 150 may be completely filled with the second layer. Thus, the terminal 100 may increase the level of the layer by 1 and request transmission of video data for the third layer 17 and 18.

When $t=t_1+6$, the video chunk at the very front portion of the buffer 150 has been played so that there is idle space at the very back portion of the buffer 150. Since the layers 15 and 16 correspond to the final video chunk of the video content, there is no transmission request performed for the first layer and second layer. The terminal 100 may request transmission of video data for the third layer 19 to 22 and may receive the video data for the third layer 19 to 22.

As set forth above, it is possible, based on the present invention, to prevent drastic changes in the quality of a picture being played, even in a network environment that entails severe bandwidth changes.

While the spirit of the invention has been described in detail with reference to specific embodiments, the embodiments are for illustrative purposes only and do not limit the invention. It is to be appreciated that many variations and equivalent embodiments can be derived by those skilled in the art without departing from the scope and spirit of the invention. The true technical scope of the invention is to be defined by the technical spirit disclosed in the appended claims.

The invention claimed is:

1. A method for receiving a streaming service for a video content coded in a layered manner, the method being performed at a terminal and comprising:
    (a) sequentially requesting transmissions of chunks of video data for a first layer that are to be stored in an idle space of a first buffer space, where the first buffer space has a first length defined by a total given playing time, and the idle space (i) comprises a first portion of the first buffer space which is not currently being used to store video data and (ii) is absent of a second portion of the first buffer space that is being used to store previously received chunks of video data; and
    (b) sequentially requesting transmissions of chunks of video data for a second layer in response to the first buffer space no longer having idle space, where the second layer is of an increased level as compared to a level of the first layer, and the chunks of video data for the second layer are to be stored in an idle space of a second buffer space that is different than the first buffer space, the second buffer space having a second length equal to the first length;
    wherein operations of (a) and (b) are performed during a decoding of video data corresponding to a single video chunk.

2. The method for receiving a streaming service according to claim 1, wherein the transmission requests sequentially requested in operations (a) and (b) are transmitted after a reception of video data corresponding to a previous transmission request is completed.

3. The method for receiving a streaming service according to claim 1, wherein a sequential order number of one of said chunks of video data for the second layer of which transmission is requested in operation (b) is greater by at least 2 than a sequential order number of the single video chunk.

4. The method for receiving a streaming service according to claim 1, wherein the second layer is an enhancement layer of a video chunk subsequent to a last one of previously received video chunks.

5. The method for receiving a streaming service according to claim 1, wherein the terminal is a PC (personal computer), a tablet PC, a notebook, a net-book, an e-reader, a PDA (personal digital assistant), a PMP (portable multimedia player), an MP3 player, an MP4 player, a mobile phone, or a smart phone.

6. The method for receiving a streaming service according to claim 1, wherein the method for receiving a streaming service is performed in a wireless network environment.

7. The method for receiving a streaming service according to claim 1, wherein the video content is coded in a layered manner by using a SVC (scalable video coding) technique.

8. The method for receiving a streaming service according to claim 1, wherein the streaming service is provided by using a DASH (dynamic adaptive streaming over HTTP) technique.

\* \* \* \* \*